Patented May 31, 1949

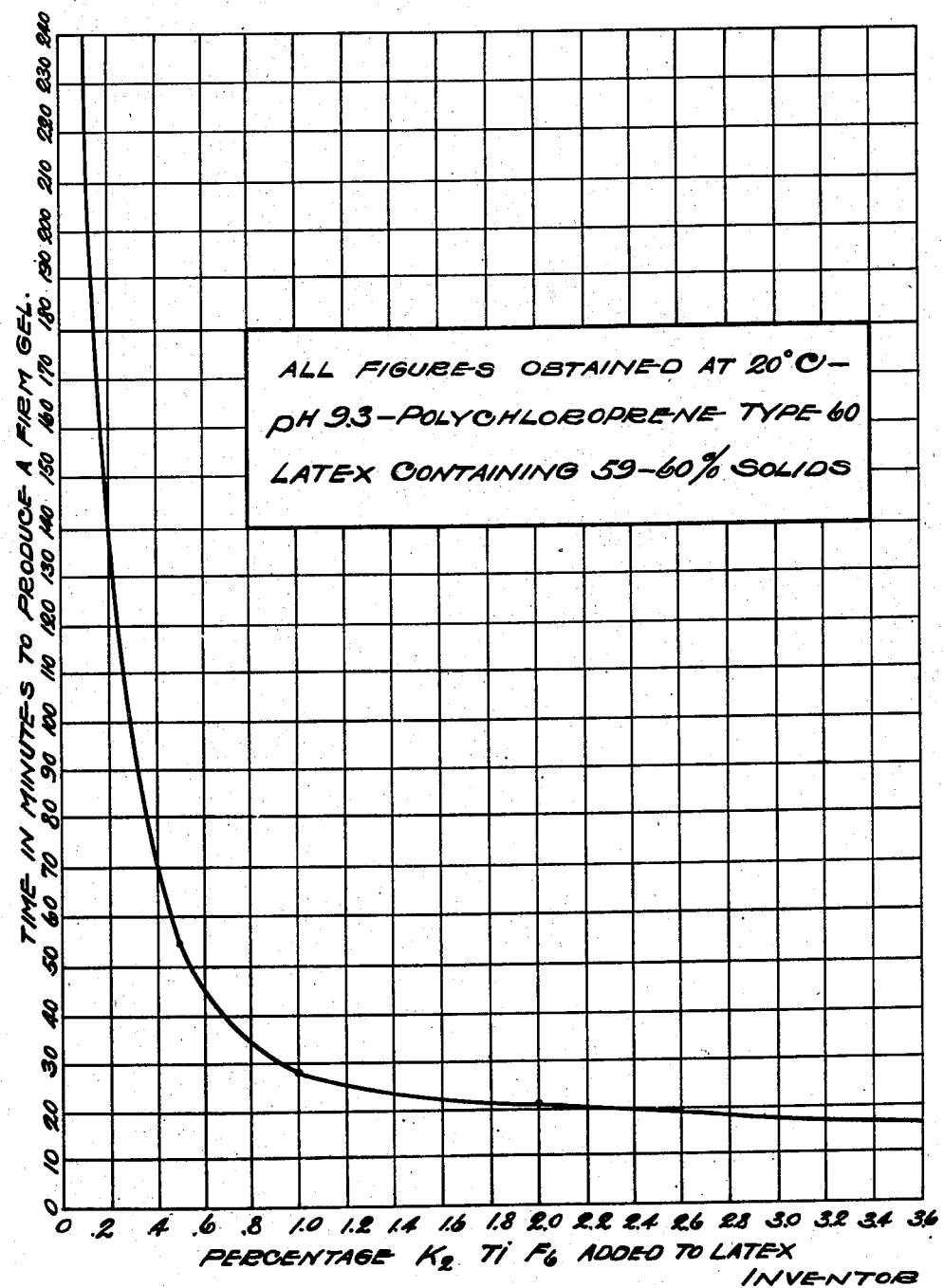

2,472,054

UNITED STATES PATENT OFFICE 2,472,054

RUBBERLIKE ARTICLES AND METHOD OF MAKING SAME

George H. McFadden, Columbus, Ohio, assignor to The Ohio State University Research Foundation, Columbus, Ohio, a corporation of Ohio Application September 25, 1948, Serial No. 51,238

22 Claims. (Cl. 260—723)

This invention relates to improvements in the manufacture of articles from an aqueous dispersion of rubber or similar material, which dispersion is capable of being gelled or coagulated under selected and controlled conditions. This action is made possible through the use of a delayed gelling agent or coagulant which consists of a salt of fluotitanic acid, a preferred embodiment being potassium fluotitanate. In this connection, any salt of fluotitanic acid including an alkali or alkaline earth metal is suitable. This application is a continuation in part of copending application, Serial No. 648,493, filed February 18, 1946, now abandoned.

It is therefore an object of the invention to provide a composition of matter comprising an aqueous dispersion of a rubber-like material which includes a salt of fluotitanic acid therein, the action of said salt being that of a delayed coagulant.

Another object of the invention is to provide a method for gelling and coagulating aqueous dispersions of rubber-like materials through the use of a controlled quantity of a salt of fluotitanic acid.

A still further object of the invention is to provide a method for manufacturing articles from an aqueous dispersion of rubber or the like, which includes the step of reacting said dispersion with a salt of fluotitanic acid for causing the dispersion to gel within a predetermined period of time.

Another object of the invention is to provide a gelling agent for causing delayed coagulation of rubber-like dispersions, said gelling agent consisting of a salt of fluotitanic acid.

Further objects and advantages of the present invention will be apparent from the following description, reference being had to the accompanying drawing, wherein preferred embodiments of the present invention are clearly shown.

In the drawing:

The drawing is a chart showing gelling time plotted against percentage of potassium fluotitanate.

The use of latices of various rubber-like materials to form molded articles is particularly desirable where the latex may be gelled or coagulated under controlled conditions after being filled into a mold. This procedure eliminates many previously necessary steps of manufacture and further provides a completely filled mold, etc., thus decreasing the number of rejects normally present when solid rubber-like material is molded. Similarly, flash and the like may be substantially eliminated and the entire manufacture of the rubber-like article may be simplified.

In this connection, the identity of a satisfactory delayed coagulant has always been the obstacle to satisfactory use of latices as mold filling materials. For this purpose, it is desirable to have a coagulant which may be mixed with the latex and which will have no action thereon for a predetermined period of time after which the latex will be coagulated by the coagulant. This procedure may be utilized in the manufacture of articles from sponge rubber, wherein the latex is compounded in the form of latex and includes blowing agents, etc., or may be used with latex, compounded latex, etc. Also sponge rubber may be formed from frothed or foamed latex wherein a delayed coagulant is present which will gel the latex in the mold and thereby occlude the air that has previously been beaten therein. Instead of molding the product, dipping, spraying or any other use may be made of the latex wherein gelation is desired after a predetermined time delay.

In all instances, the success of the process depends entirely upon the use of a delayed gelling agent or coagulant.

For this purpose, I have found that the salts of fluotitanic acid are particularly desirable and act in a delayed manner to coagulate latices, which delay may be controlled by temperature, pH of the latex, percentage of solids in the latex and quantity of the coagulant used, all of these variable factors may be varied for adjusting and controlling the period of time required for gelation and will be discussed in more detail hereinafter. In preferred embodiments, I utilize potassium or sodium fluotitanate that have the formulas of $K_2TiF_6$ and $Na_2TiF_6$ respectively or ammonium fluotitanate $(NH_4)_2TiF_6$. Other salts of fluotitanic acid are suitable, for example, any of the soluble or partially soluble salts of the alkali or alkaline earth metals may be used.

One example of the use of my improved gelling agent is as follows: 380 cc. of water is well mixed in a colloid mill with 10 grams of colloidal bentonite. After thorough mixing, 100 grams of potassium or sodium fluotitanate is added with further mixing. This slurry may then be used as a master gelling solution. The latex, in stabilized form either compounded or uncompounded, which is to be gelled is next preferably adjusted to a pH of about 9.3 after which 10 cc. of the potassium fluotitanate suspension is added for each 100 cc. of latex (in this instance containing 60% solids) and is stirred therein for from ½ minute to one minute. Next the material is filled into a mold whereupon the latex will form a firm gel in between 7½–8 minutes at a room temperature of 20° F. In this connection, latices of natural rubber, butadiene-styrene copolymers, butadiene-acrylonitrile copolymers, polychloroprene, aqueous dispersions of reclaimed rubber, coagulated latex or vulcanized rubber, etc., or any other satisfactory latex or aqueous rubber-like dispersion or mixture thereof may be coagulated in this manner. Other synthetic rubber latices may be used and these may be any latex selected from the class prepared by the polymerization in aqueous emulsion of a butadiene-1,3 hydrocarbon such as butadiene-1,3, isoprene, 2,3-dimethyl butadiene-1,3, piperylene or the like either alone or in admixture with each other and/or in admixture with lesser or equal amounts of one or more monoethylenic compounds copolymerizable therewith in aqueous emulsion such as acrylonitrile, methacrylonitrile, alpha-chloro acrylonitrile and similar acrylic nitriles; styrene, vinyl naphthalene, p-chlorostyrene and similar aryl olefins and substituted aryl olefins; methyl acrylate, methyl methacrylate, acrylamide and similar esters and amides of acrylic acids; methyl isopropenyl ketone, vinylidene chloride, isobutylene, methyl vinyl ether, and other compounds containing a single ethylenic double bond, $>C=C<$, which are copolymerizable with butadiene-1,3 hydrocarbons in aqueous emulsion. In fact, any of the compounds which may be termed butalastics as defined in the book "Butalastic Polymers, a Treatise on Synthetic Rubbers" by Marchionna may be used with success.

Compounded latex such as is disclosed in my applications with Amos G. Horney, Serial Nos. 557,551, now abandoned, and 557,552, now Patent No. 2,466,027 granted April 5, 1949, may also be used to which the coagulant may be added.

The control of the pH of the aqueous dispersion is one factor that determines the quantity of the gelling agent required to cause coagulation in a definite time. In this case, the pH of the latex (normally between 10 and 12) need not be controlled if sufficient gelling agent is added, however, by adjusting the pH less gelling agent is required and therefore is more economical.

It will be noted that no heat is specified in coagulating the latex and it is apparent that the addition of heat will hasten the gelation and permit even lower quantities of the gelling agent to be used. However, for my purpose, I believe that the simplest form of the invention requires only the simple addition of a predetermined quantity of the gelling agent to latex that has a controlled pH range.

It is understood that bentonite is used as a dispersing agent for the fluotitanate salt whereby the salt is maintained in suspension in the water solution. In place of bentonite a dispersing gum, such as, acacia or tragacanth may be used or the fluotitanate salt may be directly added to the latex in the form of a fine powder and thoroughly mixed therethrough. Obviously when adding the delayed coagulant in a slurry form, the problem of mixing is greatly reduced and a more thorough mix is generally accomplished than when using the powder. However, either type of addition will produce satisfactory results.

Addition of zinc oxide or other suitable substances may often be desirable if a speedup in gelling time is desired at a given temperature. In this instance, the zinc oxide may be added in conjunction with the fluotitanate salt in a slurry or it may be added as a powder. From 1% to 5% yields satisfactory results.

A tabulation of results of various tests in connection with one type of latex for illustrative purposes only is as follows:

| Percent $K_2TiF_6$ | Temperature, °C. | Time for Stiff Gel |
| --- | --- | --- |
| 4 | 20 | 14 Minutes. |
| 2 | 20 | 21 Minutes. |
| 1 | 20 | 27 Minutes. |
| 0.5 | 20 | 55 Minutes. |
| 0.25 | 20 | 9 hrs. |
| 0.125 | 20 | 19 hrs. + |
| 2 (with 5% ZnO) | 20 | 13 Minutes. |
| 1 (with 5% ZnO) | 20 | 15 Minutes. |
| 2 | 30 | 6 Minutes. |
| 1 | 30 | 9 Minutes. |
| 2 | 40 | 4 Minutes. |
| 1 | 40 | 8 Minutes. |

All of the latex used in the examples in this table was of the stabilized type 60 polychloroprene latex, i. e., GRN and GRS, which contains from 59%–60% solids, and had an adjusted pH of 9.3. Latex having lower concentrations or different pH may likewise be used and satisfactory gels have been formed with latices having a concentration as low as 25% solids. This variation obviously will vary the time for a gel and adjustment for concentration may be accomplished by adding more gelling agent, raising the temperature of the mold in which the gel is to take place or by the adjustment of latex pH to approximately 9.3.

The gel or coagulant obtained through the use of my gelling agent is smooth and jelly-like and is free from clots and lumps normally present in curdled latex.

While the embodiments of the present invention as herein disclosed, constitute preferred forms, it is to be understood that other forms might be adopted.

What is claimed is as follows:

1. In the manufacture of articles from aqueous dispersions of rubber-like materials, taken from the class consisting essentially of: natural rubbers, butadiene-styrene copolymers, butadiene-acrylonitrile copolymers and polychloroprene; the step of reacting an alkaline dispersion of rubber-like material with a relatively small quantity of salt of fluotitanic acid selected from the class consisting of the soluble and partially soluble salts of the alkali and alkaline earth metals and ammonium, the quantity of said salt controlling the degree and speed of gelling of said dispersion.

2. In the manufacture of articles from aqueous dispersions of rubber-like materials, taken from the class consisting essentially of: natural rubbers, butadiene-styrene copolymers, butadiene-acrylonitrile copolymers and polychloroprene; the step of reacting an alkaline dispersion of rubber-like material with a relatively small quantity of potassium fluotitanate, the quantity of said salt controlling the degree and speed of gelling of said dispersion.

3. In the manufacture of articles from aqueous dispersions of rubber-like materials, taken from the class consisting essentially of: natural rubbers, butadiene-styrene copolymers, butadiene-acrylonitrile copolymers and polychloroprene; the step of reacting an alkaline dispersion of rubber-like material with a relatively small quantity of sodium fluotitanate, the quantity of said salt controlling the degree and speed of gelling of said dispersion.

4. A new composition of matter for use in the production of rubber goods, comprising: an aqueous dispersion of rubber-like material, taken from the class consisting essentially of: natural rubbers, butadiene-styrene copolymers, butadiene-acrylonitrile copolymers and polychloroprene having admixed therewith 0.5% to 4% a salt of fluotitanic acid selected from the class consisting of the soluble and partially soluble salts of the alkali and alkaline earth metals and ammonium in a quantity sufficient to cause a delayed gelling of said dispersion.

5. A new composition of matter for use in the production of rubber goods, comprising: an aqueous dispersion of rubber-like material, taken from the class consisting essentially of: natural rubbers, butadiene-styrene copolymers, butadiene-acrylonitrile copolymers and polychloroprene having admixed therewith 0.5% to 4% potassium fluotitanate in a quantity sufficient to cause a delayed gelling of said dispersion.

6. A new composition of matter for use in the production of rubber goods, comprising: an aqueous dispersion of rubber-like material, taken from the class consisting essentially of: natural rubbers, butadiene-styrene copolymers, butadiene-acrylonitrile copolymers and polychloroprene having admixed therewith 0.5% to 4% sodium fluotitanate in a quantity sufficient to cause a delayed gelling of said dispersion.

7. A method of gelling aqueous dispersions of rubber-like material, taken from the class consisting essentially of: natural rubbers, butadiene-styrene copolymers, butadiene-acrylonitrile copolymers and polychloroprene which comprises: adding to an already alkaline aqueous dispersion of rubber-like material a salt of fluotitanic acid selected from the class consisting of the soluble and partially soluble salts of the alkali and alkaline earth metals, and ammonium.

8. A method of gelling aqueous dispersions of rubber-like material, taken from the class consisting essentially of: natural rubbers, butadiene-styrene copolymers, butadiene-acrylonitrile copolymers and polychloroprene which comprises: adding to an already alkaline aqueous dispersion of rubber-like material, relatively small quantities of potassium fluotitanate.

9. A method of gelling aqueous dispersions of rubber-like material, taken from the class consisting essentially of: natural rubbers, butadiene-styrene copolymers, butadiene-acrylonitrile copolymers and polychloroprene which comprises: adding to an already alkaline aqueous dispersion of rubber-like material, relatively small quantities of sodium fluotitanate.

10. In the manufacture of sponge rubber articles, the steps comprising: aerating latex, mixing suitable compounding ingredients into said aerated latex, and finally controlling the time for gelation of said aerated and compounded latex by the addition thereto of a predetermined small quantity of a delayed coagulant, selected from the class of fluotitanates consisting of the soluble and partially soluble salts of alkali and alkaline earth metals, and ammonium.

11. In the manufacturing of sponge rubber articles, the steps comprising: aerating latex, mixing suitable compounding ingredients into said aerated latex, and finally controlling the time for gelation of said aerated and compounded latex by the addition thereof of a predetermined small quantity of a delayed coagulant, consisting of potassium fluotitanate.

12. A new composition of matter for use in the production of sponge rubber articles comprising: a foamed and compounded latex having admixed therewith a predetermined small quantity of a delayed coagulant sufficient to cause gelation within a desired time and selected from the class of fluotitanates, consisting of: the soluble and partially soluble salts of the alkali and alkaline earth metals, and ammonium.

13. A new composition of matter for use in the production of sponge rubber articles comprising: a foamed and compounded latex having admixed therewith a predetermined small quantity of a delayed coagulant, consisting of potassium fluotitanate.

14. In the manufacture of sponge rubber articles, the steps comprising: aerating latex, mixing suitable compounding ingredients into said aerated latex, and finally controlling the time for gelation of said aerated and compounded latex by the addition thereto of a predetermined small quantity of a delayed coagulant, consisting of sodium fluotitanate.

15. A new composition of matter for use in the produceion of sponge rubber articles comprising: a foamed and compounded latex having admixed therewith a predetermined small quantity of a delayed coagulant, consisting of sodium fluotitanate.

16. In the manufacture of articles from aqueous dispersions of rubber-like materials, taken from the class consisting essentially of: natural rubbers, polychloroprene and butalastic polymers including a single ethylenic double bond $>C=C<$ which are copolymerizable with butadiene-1,3 hydrocarbon in aqueous emulsion; the step of reacting an alkaline dispersion of rubber-like material with a relatively small quantity of salt of fluotitanic acid selected from the class consisting of the soluble and partially soluble salts of the alkali and alkaline earth metals and ammonium, the quantity of salt controlling the degree and speed of gelling of said dispersion.

17. In the manufacture of articles from aqueous dispersions of rubber-like materials, taken from the class consisting essentially of: natural rubbers, polychloroprene and butalastic polymers including a single ethylenic double bond $>C=C<$ which are copolymerizable with butadiene-1,3 hydrocarbon in aqueous emulsion; the step of reacting an alkaline dispersion of rubber-like material with a relatively small quantity of potassium fluotitanate, the quantity of said salt controlling the degree and speed of gelling of said dispersion.

18. In the manufacture of articles from aqueous dispersions of rubber-like materials, taken from the class consisting essentially of: natural rubbers, polychloroprene and butalastic polymers including a single ethylenic double bond $>C=C<$ which are copolymerizable with butadiene-1,3 hydrocarbon in aqueous emulsion; the step of reacting an alkaline dispersion of rubber-like material with a relatively small quantity of sodium fluotitanate, the quantity of said salt controlling the degree and speed of gelling of said dispersion.

19. A new composition of matter for use in the production of rubber goods, comprising: an aqueous dispersion of rubber-like material, taken from the class consisting essentially of: natural rubbers, polychloroprene and butalastic polymers including a single ethylenic double bond $>C=C<$ which are copolymerizable with butadiene-1,3 hydrocarbon in aqueous emulsion; and having admixed therewith 0.5% to 4% a salt of fluotitanic acid selected from the class consisting of the soluble and partially soluble salts of the alkali and alkaline earth metals and ammonium in a quantity sufficient to cause a delayed gelling of said dispersion.

20. A new composition of matter for use in the production of rubber goods, comprising: an aqueous dispersion of rubber-like material, taken from the class consisting essentially of: natural rubbers, polychloroprene and butalastic polymers including a single ethylenic double bond >C=C< which are copolymerizable with butadiene-1,3 hydrocarbon in aqueous emulsion; and having admixed therewith 0.5% to 4% potassium fluotitanate in a quantity sufficient to cause a delayed gelling of said dispersion.

21. A new composition of matter for use in the production of rubber goods, comprising: an aqueous dispersion of rubber-like material, taken from the class consisting essentially of: natural rubbers, polychloroprene and butalastic polymers including a single ethylenic double bond >C=C< which are copolymerizable with butadiene-1,3 hydrocarbon in aqueous emulsion; and having admixed therewith 0.5% to 4% sodium fluotitanate in a quantity sufficient to cause a delayed gelling of said dispersion.

22. A method of gelling aqueous dispersions of rubber-like material, taken from the class consisting essentially of: natural rubbers, polychloroprene and butalastic polymers including a single ethylenic double bond >C=C< which are copolymerizable with butadiene-1,3 hydrocarbon in aqueous emulsion which comprises: adding to an already alkaline aqueous dispersion of rubber-like material a salt of fluotitanic acid selected from the class consisting of the soluble and partially soluble salts of the alkali and alkaline earth metals, and ammonium.

GEORGE H. McFADDEN.

No references cited.